(12) United States Patent
Aral

(10) Patent No.: US 8,857,745 B2
(45) Date of Patent: Oct. 14, 2014

(54) AGRICULTURAL SPREADER CONTROL

(75) Inventor: Gurcan Aral, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1014 days.

(21) Appl. No.: 12/778,860

(22) Filed: May 12, 2010

(65) Prior Publication Data

US 2011/0278381 A1 Nov. 17, 2011

(51) Int. Cl.
*A01C 19/00* (2006.01)
*A01C 21/00* (2006.01)
*A01C 15/12* (2006.01)

(52) U.S. Cl.
CPC ............... *A01C 15/122* (2013.01); *A01C 21/00* (2013.01)
USPC ........... 239/672; 239/676; 239/677; 239/681; 239/684; 222/58; 222/610

(58) Field of Classification Search
USPC ............. 239/67–69, 650, 672, 675, 677, 681, 239/684, 676; 222/52, 58, 63, 608, 610, 222/612, 613
See application file for complete search history.

(56) References Cited

U.S. PATENT DOCUMENTS

| | | | | |
|---|---|---|---|---|
| 5,234,128 A | * | 8/1993 | Hill | ................................. 239/650 |
| 5,979,703 A | * | 11/1999 | Nystrom | ........................... 222/58 |
| 6,092,745 A | | 7/2000 | Seymour et al. | |
| 6,905,077 B2 | | 6/2005 | Hoyle | |
| 7,400,058 B1 | | 7/2008 | Wayne et al. | |
| 2005/0131640 A1 | | 6/2005 | Price et al. | |
| 2008/0047170 A1 | | 2/2008 | Nichols | |
| 2008/0275602 A1 | | 11/2008 | Peake | |
| 2010/0018726 A1 | | 1/2010 | Chiocco | |
| 2010/0023222 A1 | | 1/2010 | Chiocco | |
| 2010/0023229 A1 | | 1/2010 | Chiocco | |

* cited by examiner

*Primary Examiner* — Steven J Ganey
(74) *Attorney, Agent, or Firm* — NUPAT, LLC

(57) ABSTRACT

A spreader control system digitally filters noisy load cell measurements and inaccurate flow rate measurements to form an optimal estimate of material weight in a spreader bin. This estimate may be combined with spreader swath width and vehicle speed to determine application rate. When actuators for parameters such as apron speed or gate size are available, spreading rates may be controlled with active feedback.

15 Claims, 3 Drawing Sheets

A

B

Kalman filter state vector:

$$\begin{pmatrix} G \\ b \end{pmatrix}$$

dynamics equations:

$$\frac{dG}{dt} = -(f+b) + w_G$$
$$\frac{db}{dt} = 0 + w_b$$

measurement equations:

$$f_m = f + b + v_f$$
$$G_m = G + v_G$$

where:

$$f = \gamma W H V$$

AGRICULTURAL SPREADER CONTROL

TECHNICAL FIELD

The disclosure is generally related to control systems for agricultural spreaders.

BACKGROUND

An agricultural spreader is a machine that spreads granular materials such as fertilizer, sand, manure, lime, chemicals, etc. Government regulations and natural market forces both encourage farmers to spread material precisely. The concentration of material applied to a farm field affects compliance with environmental rules, for example. A dairy cow can generate over 100 pounds of manure per day (although. Jerseys make less than Holsteins) and farmers must make sure that spreaders disburse the manure such that acceptable levels of nitrogen, ammonia, nitrate, phosphorus, antibiotics, pesticides, hormones, etc., are not exceeded.

In addition, profit-seeking farmers naturally try to use raw materials as efficiently as possible. Spreading too much fertilizer, for example, wastes money. Unfortunately, conventional spreading equipment lacks an accurate way to measure how much material is spread per unit time or per unit area. Mechanisms exist to vary spreading rate, but they operate open-loop; there is no way to monitor results. Thus, what is needed is an agricultural spreader control system capable of measuring and controlling the spreading rate of a spreader.

BRIEF DESCRIPTION OF THE DRAWINGS

FIG. 3 is an illustration of Kalman filtering procedures executed by a processor.

DETAILED DESCRIPTION

Figure 1:
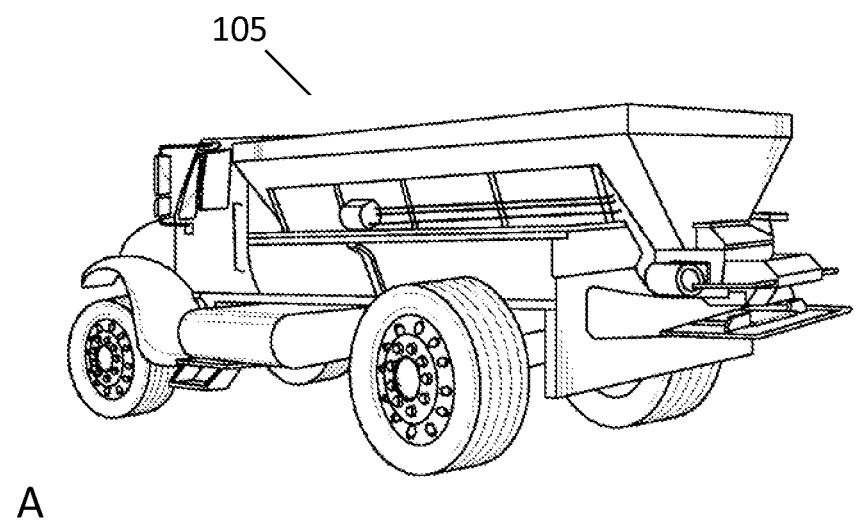
FIG. 1A is an illustration of a truck-mounted spreader.
FIG. 1B is a schematic diagram of an agricultural spreader equipped with an apron, a gate and a load cell.
Figure 1:
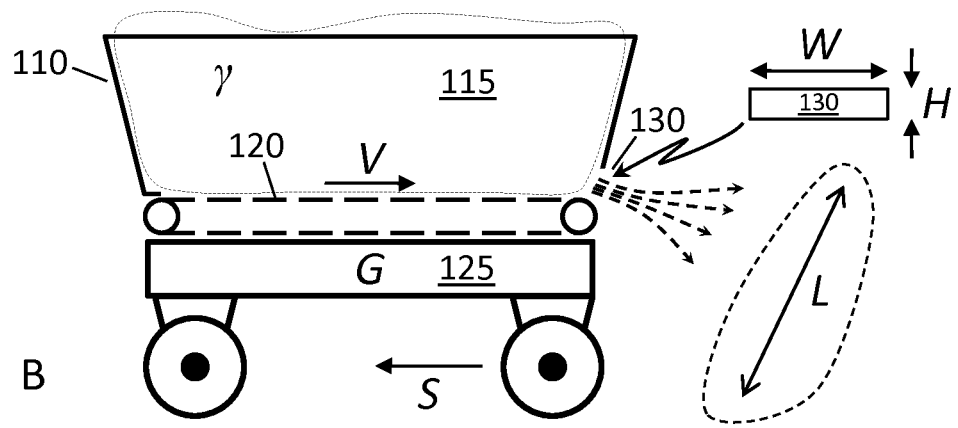

An agricultural spreader control system enables an operator to measure and control the application rate of granular materials. A dairy farmer might use such a system to control how many pounds of manure per acre he applies to his fields, for example. FIG. 1A is an illustration of a truck-mounted spreader 105. A common variation of the spreader shown in FIG. 1A is a trailer-mounted spreader that is towed behind a farm tractor. Either way, the spreaders' principles of operation are similar.

FIG. 1B is a schematic diagram of an agricultural spreader equipped with an apron, a gate, and a load cell. In FIG. 1B, a bin 110 holds a granular material 115 characterized by its density, $\gamma$. An apron or conveyor belt 120 at the bottom of bin 110 moves material 115 toward a gate 130 or opening in the rear of the bin. The apron moves with speed V while gate 130 has a width W and height H. A load cell 125 measures the weight G of bin 110 and material 115 contained in it. After material exits the bin through gate 130 it is slung across a spreading swath width L by a broadcaster (visible in FIG. 1A, but not shown in FIG. 1B) typically based on two rotating flaps that swat material over a wide area. Finally, the speed of the spreader over the ground is denoted S.

The spreader control system described here uses information from sensors, especially bin weight and apron speed sensors, to estimate the disposal rate (weight of material spread per unit time) of a spreader. That information may be combined with knowledge of the speed of the spreader over the ground and the swath width to estimate the application rate; i.e. the weight of material spread per unit area. When actuators capable of controlling parameters such as apron speed, gate height, swath width and/or spreader vehicle speed are available, the application rate may be not only estimated, but also controlled with active feedback.

Figure 2:
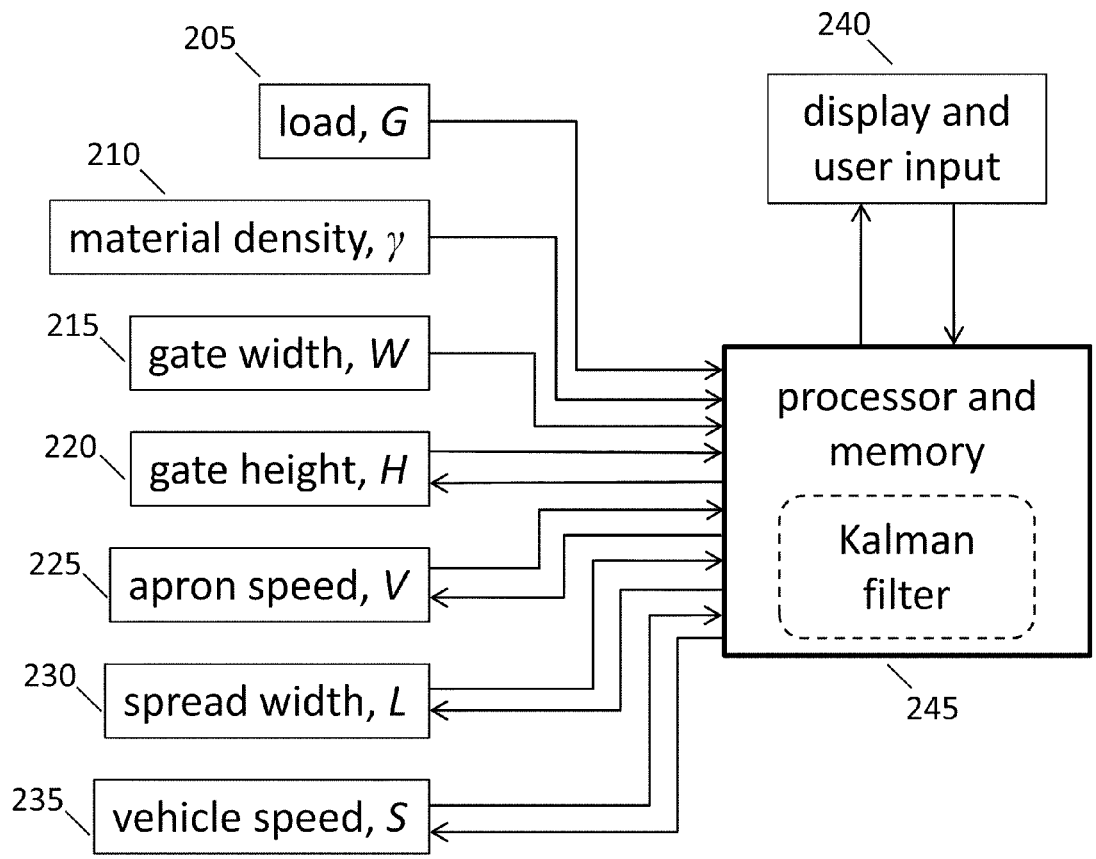
FIG. 2 is a block diagram of an agricultural spreader control system including various sensors and actuators, a processor and memory, and a display and user input unit.

FIG. 2 is a block diagram of an agricultural spreader control system including various sensors and actuators, a processor and memory, and a display and user input unit. The sensors and actuators communicate with a processor that also accepts user input and optionally displays information to a user. In FIG. 2, load cell 205 measures the weight G of a spreader bin and its contents. The density $\gamma$ of material to be spread is an input parameter represented by item 210. Gate width W is an input parameter represented by item 215. A sensor/actuator 220 measures and adjusts gate height H. Similarly sensor/actuators 225, 230, and 235 measure and adjust apron speed V, spread swath width L, and vehicle speed S.

If the sensor/actuators for gate height and apron speed are, in fact, merely sensors (not capable of changing the gate height or apron speed) then the spreader control system is able to estimate disposal rate, but not control it. Similarly, when spread swath width and vehicle speed sensors are available, application rate may be estimated. Swath width and vehicle speed actuators are needed for active feedback control of application rate. Thus if items 220, 225, 230 and/or 235 are sensors only, communication is one-way from sensor to processor; if they have actuation capabilities, communication between sensor/actuator and the processor is two-way.

Vehicle speed sensing and control functions maybe supplied by an agricultural autopilot system such as any of a number of autopilots that are becoming common on farm tractors. Processor and memory 245 may be based on a conventional microcontroller/microprocessor and electronic memory. Display and user input unit 240 may be based on a conventional (e.g. liquid crystal) display with button or touch screen input. Both processor 245 and display 240 may be components of an autopilot system. Typical autopilot systems derive position and speed information from one or more global navigational satellite systems such as the US global positioning system.

Processor 245 estimates disposal and/or application rates by executing a digital filter that provides an optimal estimate of the weight of material in a spreader bin. The filter does this by combining noisy weight measurements from a load cell (e.g. load cell 125 in FIG. 1B) with biased (i.e. somewhat erroneous) information about material flow rate through a gate (e.g. gate 130 in FIG. 1B). This system is described here in terms of a Kalman filter, although other digital filtering systems may be used.

A load cell provides an accurate, but very noisy, estimate of weight. Every time a spreader goes over a bump (i.e. very often) the load cell output spikes. One might think that a simple low-pass filter on the output of the load cell would smooth out the measurements sufficiently to make them useful. Unfortunately, simple low pass filtering gives an estimate that is either not smooth enough to be useful, or so damped that it does not keep up with the actual change in bin weight.

Another way to measure disposal rate is via the material density $\gamma$, apron speed V, and gate cross section WH. In principle, $f = \gamma W H V$, where f is the flow rate (weight per unit time) of material through the gate. This method is subject to several possible errors, however. First of all the effective gate opening is likely less than WH due to nozzle effects and accumulation of debris. Second, the speed of the granular material is less than the speed V of the apron. Third, the density $\gamma$ varies due to compression; material at the bottom of the bin is squeezed by the weight of material above it and thus has higher density. These and other sources of error may be lumped together into an unknown bias, b. Fortunately biases just mentioned are likely to be constant or nearly so; thus $$\frac{db}{dt} \approx 0.$$

Load cell or flow rate measurements are thus individually insufficient to provide an accurate, useful estimate of material disposal or application rate. A digital filter, with knowledge of system dynamics, combines accurate but noisy load cell measurements with smooth but inaccurate flow measurements to provide an estimate of bin weight G and bias b. When a Kalman filter is used, the estimate is optimal in the sense that it is the best possible estimate based on the information available. The Kalman filter takes advantage of the fact that although the load cell output is noisy, its rapid variations are not correlated with the flow rate.

FIG. 3 is an illustration of Kalman filtering procedures 305 executed by a processor. The state of the system is represented by state vector:

$$\begin{pmatrix} G \\ b \end{pmatrix}$$

where G is the net weight of material as measured by a load cell and b is the bias in flow rate; i.e. disposal rate=f+b where f=γWHV. The dynamics equations are:

$$\frac{dG}{dt} = -(f+b) + w_G$$

$$\frac{db}{dt} = 0 + w_b$$

where $w_G$ and $w_b$ represent process noise for G and b respectively. The measurement equations are:

$$f_m = f + b + v_f$$

$$G_m = G + v_G$$

where f is measured via sensors for H and V, and known values (e.g. stored in memory) for γ and W. $v_f$ and $v_G$ represent flow rate measurement noise and weight measurement noise respectively. The state vector, dynamics equations and measurement equations provide a complete prescription for Kalman filtering of the load cell and flow rate measurements.

Given an optimal estimate for net weight G of material in a spreader bin, the estimated disposal rate (weight of material spread per unit time) is equal to $$\frac{dG}{dt}$$

and the application rate (weight of material spread per unit area) is $$\left(\frac{1}{LS}\right)\frac{dG}{dt}.$$

When actuators for H, V, L, and/or S are available, the processor may adjust parameters as needed to control disposal and/or application rates. For example, if the measured disposal rate is lower than a desired set point, the apron speed and/or gate height may be manually or automatically increased. Or, if the application rate is greater than a desired set point, the spread width and/or vehicle speed may be increased.

When the spreader control system is integrated with an agricultural autopilot, even more complex operations become possible. For example, an autopilot may include a field map with areas marked out for different application rates. An integrated autopilot/spreader control system may apply material to a field at preprogrammed rates mapped out by a farmer using computer aided farming software.

The spreader control system is thus a valuable component in a precision farming operation. By providing a farmer with accurate spreader measurement and control functions, it enables him to comply with environmental regulations and use materials such as fertilizers as efficiently as possible.

The above description of the disclosed embodiments is provided to enable any person skilled in the art to make or use the disclosure. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. An agricultural spreader control system comprising:
a weight sensor that measures the weight of a spreader bin;
an apron speed sensor that measures the speed of an apron that moves material at the bottom of the bin toward a gate; and,
a processor that: receives measurements from the weight sensor and the apron speed sensor, and digitally filters those measurements in combination with material density and gate area information to form an estimate of the weight of material in the bin.

2. The system of claim 1 wherein the processor further estimates the time rate of change of the weight of material in the bin.

3. The system of claim 1 wherein the processor further estimates the time rate of change of the volume of material in the bin.

4. The system of claim 1 further comprising: a gate height sensor, wherein the processor receives measurements from the gate height sensor and uses those measurements to estimate gate area.

5. The system of claim 1 further comprising: spread swath width sensor, wherein the processor receives measurements from the spread swath width sensor and uses those measurements to estimate the weight of material applied by a spreader per unit area.

6. The system of claim 1 further comprising: a vehicle speed sensor, wherein the processor receives measurements from the vehicle speed sensor and uses those measurements to estimate the weight of material applied by a spreader per unit area.

7. The system of claim 6 wherein the vehicle speed sensor comprises a global navigational satellite system receiver.

8. The system of claim 1 wherein the processor executes a Kalman filter to form an optimal estimate of the weight of material in the bin.

9. An agricultural spreader control system comprising:
- a weight sensor that measures the weight of a spreader bin;
- an apron speed sensor/actuator that measures and controls the speed of an apron that moves material at the bottom of the bin toward a gate; and,
- a processor that: receives measurements from the weight sensor and the apron speed sensor/actuator; filters those measurements in combination with material density and gate area information to form an estimate of the time rate of change of the weight of material in the bin; and, commands the apron speed sensor/actuator to adjust the speed of the apron such that material is disposed from the bin at a desired rate.

10. The system of claim 9 further comprising: a gate height sensor/actuator, wherein the processor: receives measurements from the gate height sensor/actuator and uses those measurements to estimate gate area; and, commands the gate height sensor/actuator to adjust the height of the gate such that material is disposed from the bin at a desired rate.

11. The system of claim 9 further comprising: a spread swath width sensor/actuator, wherein the processor: receives measurements from the spread swath width sensor/actuator and uses those measurements to estimate the weight of material applied by a spreader per unit area; and, commands the spread swath width sensor/actuator to adjust spread swath width such that material is applied from the bin at a desired rate per unit area.

12. The system of claim 9 further comprising: a vehicle speed sensor/actuator, wherein the processor: receives measurements from the vehicle speed sensor/actuator and uses those measurements to estimate the weight of material applied by a spreader per unit area; and, commands the vehicle speed sensor/actuator to adjust vehicle speed such that material is applied from the bin at a desired rate per unit area.

13. The system of claim 12 wherein the vehicle speed sensor/actuator comprises a speedometer and a throttle control.

14. The system of claim 12 wherein the vehicle speed sensor/actuator comprises a global navigational satellite system receiver.

15. The system of claim 9 wherein the processor executes a Kalman filter to form an optimal estimate of the time rate of change of the weight of material in the bin.

* * * * *

UNITED STATES PATENT AND TRADEMARK OFFICE
CERTIFICATE OF CORRECTION

PATENT NO. : 8,857,745 B2  
APPLICATION NO. : 12/778860  
DATED : October 14, 2014  
INVENTOR(S) : Gurcan Aral Page 1 of 1

It is certified that error appears in the above-identified patent and that said Letters Patent is hereby corrected as shown below:

In the Specification,

Column 3, line 25, the state vector should appear as follows:

$$\begin{pmatrix} G \\ b \end{pmatrix}$$

Signed and Sealed this  
Sixth Day of January, 2015

Michelle K. Lee  
*Deputy Director of the United States Patent and Trademark Office*